(12) United States Patent
Kong (10) Patent No.: US 11,784,801 B2
(45) Date of Patent: Oct. 10, 2023

(54) KEY MANAGEMENT METHOD AND RELATED DEVICE

(71) Applicant: Tencent Technology (Shenzhen) Company Limited, Guangdong (CN)

(72) Inventor: Qinglei Kong, Shenzhen (CN)

(73) Assignee: Tencent Technology (Shehnzhen) Company Limited, Guangdong (CN)

( * ) Notice: Subject to any disclaimer, the term of this patent is extended or adjusted under 35 U.S.C. 154(b) by 306 days.

(21) Appl. No.: 17/400,494

(22) Filed: Aug. 12, 2021

(65) Prior Publication Data

US 2021/0377010 A1    Dec. 2, 2021

Related U.S. Application Data

(63) Continuation of application No. PCT/CN2020/091002, filed on May 19, 2020.

(30) Foreign Application Priority Data

May 27, 2019    (CN) .......................... 201910445155.9

(51) Int. Cl.
*H04L 9/40*    (2022.01)
*H04L 9/08*    (2006.01)
(Continued)

(52) U.S. Cl.
CPC .......... *H04L 9/0825* (2013.01); *H04L 9/3066* (2013.01); *H04L 63/045* (2013.01); *G06Q 2220/10* (2013.01); *H04L 67/1097* (2013.01)

(58) Field of Classification Search
CPC ... H04L 9/0825; H04L 9/3066; H04L 63/045; H04L 67/1097
See application file for complete search history.

(56) References Cited

U.S. PATENT DOCUMENTS 9,645,794 B2 *    5/2017    Peeters ................. H04L 9/3066
10,326,762 B2     6/2019    Fitzgerald et al.
(Continued)

FOREIGN PATENT DOCUMENTS

CN    105119894 A    12/2015
CN    105210327 A    12/2015
(Continued)

OTHER PUBLICATIONS

EPO Communication pursuant to Rules 70(2) and 70a(2) EPC, dated Apr. 26, 2022, 1p.
(Continued)

*Primary Examiner* — Thaddeus J Plecha
(74) *Attorney, Agent, or Firm* — Crowell & Moring LLP (57) ABSTRACT

Embodiments of this disclosure disclose a key management method and a related device, the method including: selecting a random number and a key according to an operation instruction inputted by a user; generating a first encryption ciphertext of the key, according to the random number, the key, a first public key, and a second public key, the first public key being determined according to a point on an elliptic curve and a private key of a hardware security module (HSM), and the second public key being determined according to the point on the elliptic curve and a private key of the client; generating a symmetric key sequence according to the key and a preselected hash function; encrypting (Continued)

data according to the symmetric key sequence to obtain a data ciphertext; and transmitting the first encryption ciphertext and the data ciphertext to a cloud server.

20 Claims, 5 Drawing Sheets

(51) Int. Cl.
*H04L 9/30* (2006.01)
*H04L 67/1097* (2022.01)

(56) References Cited

U.S. PATENT DOCUMENTS

| | | | |
|---|---|---|---|
| 10,958,424 B1* | 3/2021 | Chhabra | ................. H04L 9/083 |
| 2016/0285625 A1* | 9/2016 | Roth | ..................... H04L 9/0822 |
| 2018/0212762 A1 | 7/2018 | Peddada et al. | |
| 2019/0132127 A1 | 5/2019 | Birke et al. | |
| 2020/0235915 A1* | 7/2020 | Wright | ................. H04L 9/0872 |

FOREIGN PATENT DOCUMENTS

| | | |
|---|---|---|
| CN | 107403109 A | 11/2017 |
| CN | 110417726 A | 11/2019 |
| WO | WO 2014/204862 A1 | 12/2014 |
| WO | WO 2020/238694 A1 | 12/2020 |

OTHER PUBLICATIONS

Extended (Supplementary) European Search Report for European application No. EP 20 81 4904, dated Apr. 7, 2022, 8p.
Chen, Lily, "Recommendation for Key Derivation Using Pseudorandom Functions" (Revised), *National Institute of Standards and Technology, U.S. Department of Commerce*, NIST Soecial Publication 800-108, Oct. 2009, 21p.
Yokoo, Makoto et al., "Secure distributed constraint satisfaction: reaching agreement without revealing private information", *Artificial Intelligence*, Elsevier Science Publisher, v. 161, 2005, pp. 229-245.
International Search Report and Written Opinion for priority application No. PCT/CN2020/091002, dated Aug. 14, 2020, 9p, in Chinese language.
English language translation of the International Search Report fot priority application No. PCT/CN2020/091002, dated Aug. 14, 2020, 2p.
Chinese International Search Report for CN 201910445155.9, dated Mar. 12, 2021, 2p.
Chinese Office Action issued for CN 201910445155.9, dated Mar. 19, 2021, 3p. in Chinese language.

* cited by examiner

| Encryption ciphertext $Ek$ | Data ciphertext (Enc(m1), ..., Enc(mk)) |

KEY MANAGEMENT METHOD AND RELATED DEVICE

RELATED APPLICATIONS

This application is a continuation of PCT Application No. PCT/CN2020/091002, entitled "KEY MANAGEMENT METHOD AND RELATED DEVICE" and filed on May 19, 2020, which claims priority to Chinese Patent Application No. 201910445155.9, entitled "KEY MANAGEMENT METHOD AND RELATED DEVICE" and filed on May 27, 2019. The above applications are incorporated herein by reference in their entireties.

TECHNICAL FIELD

This disclosure relates to the field of security technologies, and in particular, to a key management method and a related device.

BACKGROUND

Key management service (KMS) is a cloud key escrow service that aims at creating and controlling encryption keys required for encrypted data and that is integrated with other cloud servers, to enable the cloud servers to manage the encrypted data by using the encryption keys.

SUMMARY

Embodiments of this disclosure provide a key management method and a related device, to improve efficiency in generation and storage of a cloud-stored key, and ensure security of cloud-stored data.

According to a first aspect, an embodiment of this disclosure provides a key management method, including:
  selecting, by a client, a random number and a key according to an operation instruction inputted by a user;
  generating, by the client, a first encryption ciphertext of the key according to the random number, the key, a first public key, and a second public key, the first public key being determined according to a point on an elliptic curve and a private key of an HSM, and the second public key being determined according to the point on the elliptic curve and a private key of the client;
  generating, by the client, a symmetric key sequence according to the key and a preselected hash function;
  encrypting data according to the symmetric key sequence to obtain a data ciphertext; and
  transmitting, by the client, the first encryption ciphertext and the data ciphertext to a cloud server.

According to a second aspect, an embodiment of this disclosure provides another key management method, including:
  receiving, by a cloud server, a first encryption ciphertext transmitted by a client, the first encryption ciphertext being generated according to a random number, a key, a first public key, and a second public key, the first public key being determined according to a point on an elliptic curve and a private key of an HSM, the second public key being determined according to the point on the elliptic curve and a private key of the client;
  receiving, by the cloud server, a data ciphertext transmitted by the client, the data ciphertext being obtained by encrypting data according to a symmetric key sequence, and the symmetric key sequence being generated according to the key and a preselected hash function; and
  storing, by the cloud server, the first encryption ciphertext and the data ciphertext.

According to a third aspect, an embodiment of this disclosure provides a client, including:
  a selection module, configured to select a random number and a key according to an operation instruction inputted by a user;
  a processing module, configured to generate a first encryption ciphertext of the key according to the random number, the key, a first public key, and a second public key, the first public key being determined according to a point on an elliptic curve and a private key of an HSM, and the second public key being determined according to the point on the elliptic curve and a private key of the client,
  the processing module being further configured to generate a symmetric key sequence according to the key and a preselected hash function, and encrypt cloud-stored data according to the symmetric key sequence to obtain a data ciphertext; and
  a transmitting module, configured to transmit the first encryption ciphertext and the data ciphertext to a cloud server.

According to a fourth aspect, an embodiment of this disclosure provides a cloud server, including:
  a receiving module, configured to receive a first encryption ciphertext and a data ciphertext transmitted by a client, the first encryption ciphertext being generated according to a random number, a key, a first public key, and a second public key, the first public key being determined according to a point on an elliptic curve and a private key of an HSM, the second public key being determined according to the point on the elliptic curve and a private key of the client, the data ciphertext being obtained by encrypting cloud-stored data according to a symmetric key sequence, and the symmetric key sequence being generated according to the key and a preselected hash function.

According to a fifth aspect, an embodiment of this disclosure provides another client, including a processor, a memory, and a communication bus, the communication bus being configured to implement connection and communication between the processor and the memory, and the processor executing a program stored in the memory, to implement the steps in the key management method according to the foregoing first aspects or the embodiments disclosed herein.

In an exemplary design, the client provided in this disclosure may include a corresponding module configured to perform an action of the client in the foregoing method design. The module may be software and/or hardware.

According to a sixth aspect, an embodiment of this disclosure provides another cloud server, including a processor, a memory, and a communication bus, the communication bus being configured to implement connection and communication between the processor and the memory, and the processor executing a program stored in the memory, to implement the steps in the key management method according to the second aspect.

In an exemplary design, the cloud server provided in this disclosure may include a corresponding module configured to perform an action of the cloud server in the foregoing method design. The module may be software and/or hardware.

According to a seventh aspect, an embodiment of this disclosure provides a non-transitory computer-readable storage medium, the computer-readable storage medium storing instructions, the instructions, when run on a computer, causing the computer to perform the methods of the embodiments disclosed herein.

According to an eighth aspect, an embodiment of this disclosure provides a computer program product including instructions, when run on a computer, the computer program product causing the computer to perform the method according to the foregoing aspects.

According to another aspect, an embodiment of this disclosure provides another key management method, including:

providing a private key of a hardware security module (HSM), the private key of the HSM being used to determine a first public key to be used, with a second public key, to generate a first encryption ciphertext of a key by encrypting the key according to the first public key and the second public key;

receiving the first encryption ciphertext from a cloud server; and decrypting the first encryption ciphertext, by the HSM, according to the private key of the HSM, a point on a elliptic curve, and a random number, to obtain a second encryption ciphertext; and transmitting the second encryption ciphertext to a client, the second encryption ciphertext being configured to be decrypted by the client, according to a private key of the client, the random number, and the point on the elliptic curve, to obtain the key for decrypting a data ciphertext from the cloud server.

BRIEF DESCRIPTION OF THE DRAWINGS

To describe technical solutions in embodiments of this disclosure more clearly, the following briefly introduces the accompanying drawings required for describing the embodiments. Apparently, the accompanying drawings in the following description show some embodiments of this disclosure, and a person of ordinary skill in the art may still derive other accompanying drawings from these accompanying drawings without creative efforts.

DESCRIPTION OF EMBODIMENTS

The following clearly and completely describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without making creative efforts shall fall within the protection scope of this disclosure.

For ease of understanding, the terms are explained below.

1. Key management service (KMS): a secure, easy-to-use key generation and management service. An objective of a KMS is to protect the security of statically-stored data of a user, that is, the confidentiality, the integrity, and the availability of the data of the user. The KMS is deployed on a cloud server to allow a user to securely and conveniently use and manage a key for data protection and data encryption and decryption, and focus on scenarios of static data encryption and decryption of the cloud server.

2. Hardware security module (HSM): a computer hardware device configured to guarantee and manage a digital key used by a strong authentication system and also provide a cryptography-related operation, and is connected directly to a computer and a network server through an expansion card and an external device. Because the HSM can provide, for an application program, services of protecting an encryption key, and configuring encryption, decryption, identity authentication, and a digital signature, the HSM of the cloud server can provide protection for storage of a root key of data. In addition, the HSM provides two tamper-proof functions, specifically, tamper evidence and tamper resistance functions.

3. Hash function: also referred to as a hashing function. The hash function converts an input of an arbitrary length into an output of a fixed length by using a hashing algorithm, and includes the following basic properties:

(1) Pre-image resistance: This property indicates one-wayness of an operation direction of the hash function. Given a hash value h, corresponding information m(h=hash(m)) cannot be found, that is, only an output can be derived from an input, but an input cannot be calculated from an output.

(2) Second pre-image resistance: This property means that an input of which an output result is caused to be equal to a known output result cannot be found. Given an input m1, another input m2 that causes hash values to be hash(m1)=hash(m2) cannot be found.

(3) Collision resistance: This property means that two different inputs m1 and m2 of which output results hash(m1) and hash(m2) are caused to be the same, hash (m1)=hash(m2), cannot be found.

4. Elliptic curve cryptography (ECC): a mathematical public-key encryption algorithm based on elliptic curves. The mathematical basis of the ECC is the computational difficulty in constituting elliptic discrete logarithms on an abelian additive group by using rational points on an elliptic curve. A main advantage of the ECC lies in using smaller keys compared to another method (for example, the RSA encryption algorithm) in some cases to provide equivalent or higher-level security.

5. Symmetric-key encryption (SKE): an encryption algorithm in which a same key needs to be used for encryption and decryption. Due to a high speed thereof, the SKE is generally used when a message sender needs to encrypt a large amount of data. Advanced Encryption Standard (AES) is a block encryption standard using a substitution-permutation network, and serves as one of the most popular algorithms in SKE.

Use of the KMS mainly includes two scenarios: (1) using a master key stored on the KMS to encrypt/decrypt data by calling an application programming interface (API) of the KMS; and (2) using a data key in a cloud server to encrypt/decrypt data, and using a master key in the KMS to protect the data key. In the KMS, the master key is protected by an HSM, and the master key can only be used in the HSM to ensure availability, security and durability of the key. In addition, the KMS supports a customer to create a master key and import the master key into the HSM.

Figure 1:
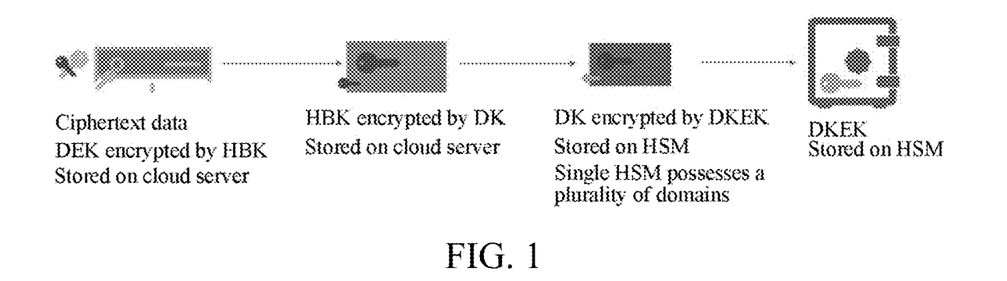
FIG. 1 is a schematic diagram of a key management method according to an existing technical solution.

FIG. 1 is a schematic diagram of a key management method according to an existing technical solution. A data encryption key (DEK) is protected by an HSM backing key (HBK), the HBK is protected by a domain key (DK). The DK is protected by a domain key encryption key (DKEK), which is permanently stored, and the DKEK is stored on an HSM. Table 1 is a KMS key management structure. The DKEK is an outermost encryption key, the DK is a second outermost encryption key, the HBK is an inner encryption key, and the DEK is an innermost encryption key. The DK, the HBK and the DEK are all generated by the HSM.

TABLE 1

|  | Generated by | Upper encryption key | Description |
| --- | --- | --- | --- |
| DK | HSM | DKEK | Permanently stored on HSM |
| HBK | HSM | DK | Stored in cloud storage |
| DEK | HSM | HBK | One-time pad |

The existing KMS key management solutions have the following technical problems: (1) In view of the sensitivity of current customers to data privacy protection, a data key and encrypted data are both managed by a cloud server. Even if a cloud service provider strictly controls and supervises equipment maintenance and management personnel, a scenario in which an insider leaks and steals data still often occurs. (2) Because an encrypted data key and encrypted data are both stored on a cloud storage server, costs of key management and encryption key storage of the cloud server are increased. (3) Because a layer-by-layer wrapping structure between keys is used, costs of key decryption and key storage of the HSM are also increased. Because of limited computing and storage capabilities of the HSM, costs of equipment investment of the cloud server are increased.

Figure 2:
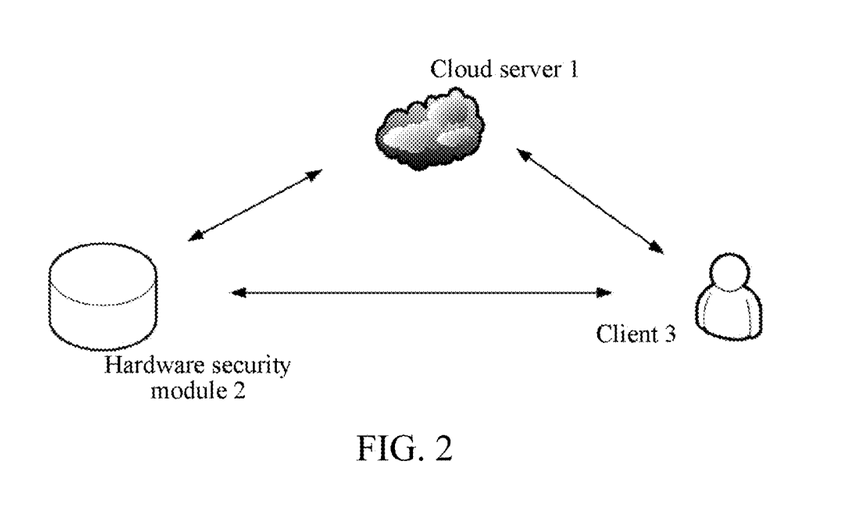
FIG. 2 is a schematic architectural diagram of a key management system according to an embodiment of this disclosure.

FIG. 2 is a schematic architectural diagram of a key management system according to an embodiment of this disclosure. The key management system in this embodiment of this disclosure includes a cloud server 1, an HSM 2, and a client 3. The cloud server 1 is a component of a cloud computing service, and is a service platform providing comprehensive service capabilities to a variety of Internet users. The service platform integrates three elements of an Internet application in the conventional sense: computing, storage, and the network, and provides public Internet infrastructure services for users. Each cluster node in the cloud server is deployed in a backbone data center of the Internet, and can independently provide Internet infrastructure services such as computing, storage, online backup, escrow, and bandwidth. The HSM 2 is an HSM of the cloud server. The HSM 2 is a computer hardware device that may be configured to guarantee and manage a digital key used by a strong authentication system and also provide a cryptography-related operation, and is connected (directly) to a computer and a network server through an expansion card and an external device. Because the HSM 2 can provide, for an application program, services of protecting an encryption key, configuring encryption, decryption, identity authentication, and a digital signature, the HSM 2 can provide protection for storage of a root key of data. In addition, the HSM 2 provides two tamper-proof functions, including, tamper evidence and tamper resistance functions. The client 3 may be a smartphone, a portable computer, a handheld communication device, a handheld computing device, a satellite radio device, a global positioning system, a personal digital assistant (PDA), and/or any other appropriate device used for communication on a wireless communication system and the like. The cloud server 1, the HSM 2, and the client 3 may establish network connections to each other and communicate with each other through the established network connections.

This embodiment of this disclosure is applicable to the following scenarios: privacy protection of cloud-stored data and generation of a cloud-stored key. In this embodiment of this disclosure, the DEK is protected by using a public key of the HSM and a public key of the client, so that cloud-stored data of the client can be decrypted only when the HSM and the client perform decryption jointly.

Figure 3:
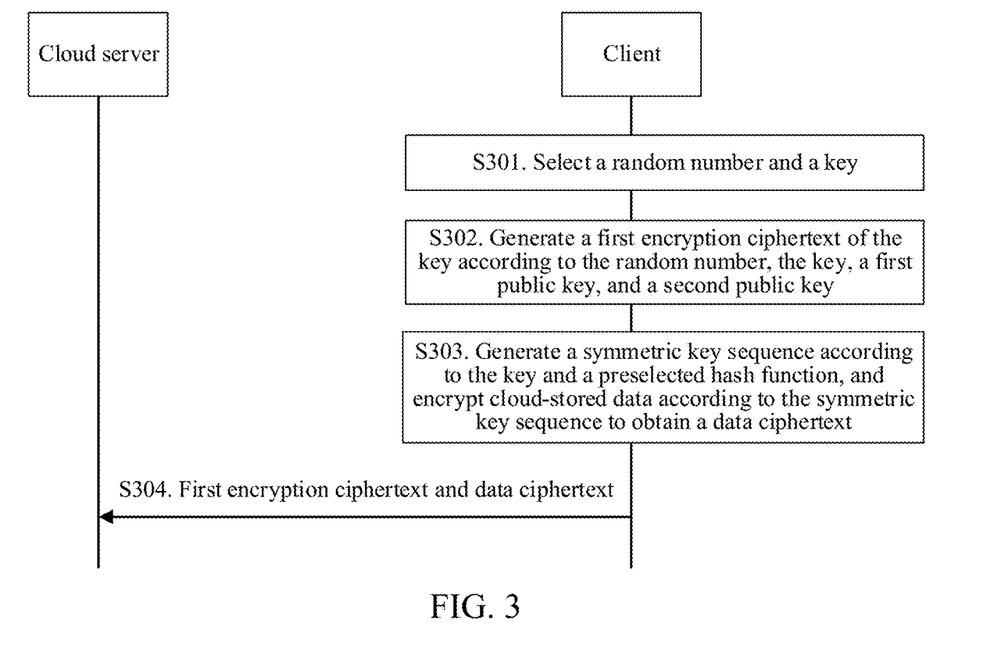
FIG. 3 is a schematic flowchart of a key management method according to an embodiment of this disclosure.

FIG. 3 is a schematic flowchart of a key management method according to an embodiment of this disclosure. The procedure includes key generation and data encryption processes. This embodiment of this disclosure includes at least the following steps:

S301. A client selects a random number and a key according to an operation instruction inputted by a user. The random number and the key are both less than n, n being an order of a point on an elliptic curve.

In a specific implementation, for example, a user may access, through a client, a web page for creating a key on a cloud server. The client may receive an operation instruction inputted by the user through the web page for creating a key (for example, the user clicks or taps a button for generating a key on the web page), and execute code on the web page, to select any integer from a range from 1 to n−1 as a random number, and select an integer from a range from 1 to n−1 as a key, n being an order of a point on an elliptic curve. For example, for an elliptic curve E: $y^2=x^3+ax+b$, if for a point P on the elliptic curve, a minimum positive integer n exists and makes n times P=O∞, n is referred to as an order of P, and if n does not exist, P is of infinite order. O∞ is an infinity point on the elliptic curve.

Exemplarily, before the client selects a random number and a key, the HSM can perform initialization on the key management system. For example, when a user creates an account of the user on the cloud server, the HSM performs the initialization on the key management system. Specifically, the HSM selects one prime number q from a plurality of prime numbers, and then, selects two non-negative integers a and b less than q from a plurality of integers, to make that $4a^3=27b^2=0$ mod q is not established. Therefore, all points (x, y) that satisfy the formula E: $y^2=x^3+ax+b$ and the infinite point O∞ form an elliptic curve, where x and y are integers ranging from 0 to p−1. Then, the HSM performs discretization on the elliptic curve, for example, $y^2=x^3+ax+b$ mod q, to obtain all solutions $(x, y) \in Z_q$ and one infinite point O∞. Finally, the HSM selects one point P from all the solutions as any point on the elliptic curve, and an order of the point P is n. In addition, the HSM may select one hash function from a plurality of hash functions, to make the hash function satisfy a condition H: $\{0,1\}^* \to \{0,1\}^{1024}$. The hash function may map any character string to a character string of a fixed length.

Then, the HSM may select an integer $s_1$ from [1, n−1] as a private key of the HSM, and then calculate a first public key of the HSM according to the private key of the HSM and the point P on the elliptic curve, where the first public key is $S_1=s_1g^P$, and may be represented as $(S_1, P)$.

During initialization of the key management system, the client may receive the point P on the elliptic curve and n (an order of P) sent by the HSM, then select, according to a selection instruction inputted by the user (for example, the selection instruction is inputted through a web page provided by the cloud server or the HSM), select one integer $s_2$ from [1, n−1] as a private key of the client, and then calculate a second public key of the client according to the private key of the client and the point P on the elliptic curve, where the second public key $S_2=s_2g^P$, and may be represented as $(S_2, P)$. The user may download the private key of the client through the client, and store the private key in a memory of the client. The public key and the private key of the client are also referred to as a public key and a private key of the user.

S302. The client generates a first encryption ciphertext of the key according to the random number, the key, a first public key, and a second public key, the first public key being determined according to a point on an elliptic curve and a private key of an HSM, and the second public key being determined according to the point on the elliptic curve and a private key of the client;

In a specific implementation, the client may generate, by using the ECC, an encryption ciphertext Ek (that is, the first encryption ciphertext) of a key K according to both the first public key $(S_1, P)$ of the HSM and the second public key $(S_2, P)$ of the client, where Ek, for example, is:

$$Ek=(r \cdot P, (S_1+S_2) \cdot r+k), \quad \text{(Formula 1)}$$

where r is the random number, k is the key, $S_1$ is the first public key, and $S_2$ is the second public key. It can be learned from formula 1 that the encryption ciphertext Ek is determined jointly by the first public key of the HSM and the second public key of the client. r·P represents calculating a mapped point on the elliptic curve according to the random number r and the point P on the elliptic curve. The private key of the HSM is an integer selected by the HSM from a range from 1 to n−1, and the private key of the client is an integer selected by the client from a range from 1 to n−1, n being an order of the point on the elliptic curve.

S303. The client generates a symmetric key sequence according to the key and a preselected hash function, and encrypts cloud-stored data according to the symmetric key sequence to obtain a data ciphertext.

In a specific implementation, the client may call an encryption API, to generate, according to the key and a preselected hash function, a symmetric key sequence $(H(1\|k), H(2\|k), \ldots, H(m\|k))$ used for encrypting cloud-stored data, where k is the key, and H is the hash function, and encrypt, by using the ECC, cloud-stored data (m1, m2, . . . mk) according to the symmetric key sequence $(H(1\|k), H(2\|k), \ldots, H(m\|k))$ to obtain a data ciphertext (Enc (m1), . . . , Enc (mk)).

Figure 4:
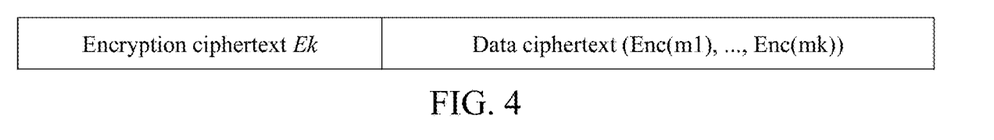
FIG. 4 is a schematic diagram of a storage format of an encryption ciphertext and a data ciphertext according to an embodiment of this disclosure.

S304. The client transmits the first encryption ciphertext and the data ciphertext to a cloud server. The cloud server stores the first encryption ciphertext and the data ciphertext. For example, FIG. 4 is a schematic diagram of a storage format of a first encryption ciphertext and a data ciphertext according to an embodiment of this disclosure. The former portion is the first encryption ciphertext, and the latter portion is the data ciphertext. The data ciphertext can be decrypted by using the first encryption ciphertext. Because the first encryption ciphertext is generated according to the first public key of the HSM and the second public key of the client, the first encryption ciphertext needs to be jointly decrypted by the HSM and the client, so as to obtain the key.

In this embodiment of this disclosure, the client generates an encryption key according to both the public key of the HSM and the public key of the client, so that the cloud server does not need to process the DEK in the KMS, and does not require the client to simultaneously store the data either, thereby reducing a computing load of the KMS and a data storage load of the cloud. For the HSM, because a layer-by-layer wrapping key structure is not used in this solution, computing operation costs for the HSM to generate, encrypt, and decrypt a hierarchical key are greatly lowered.

Figure 5:
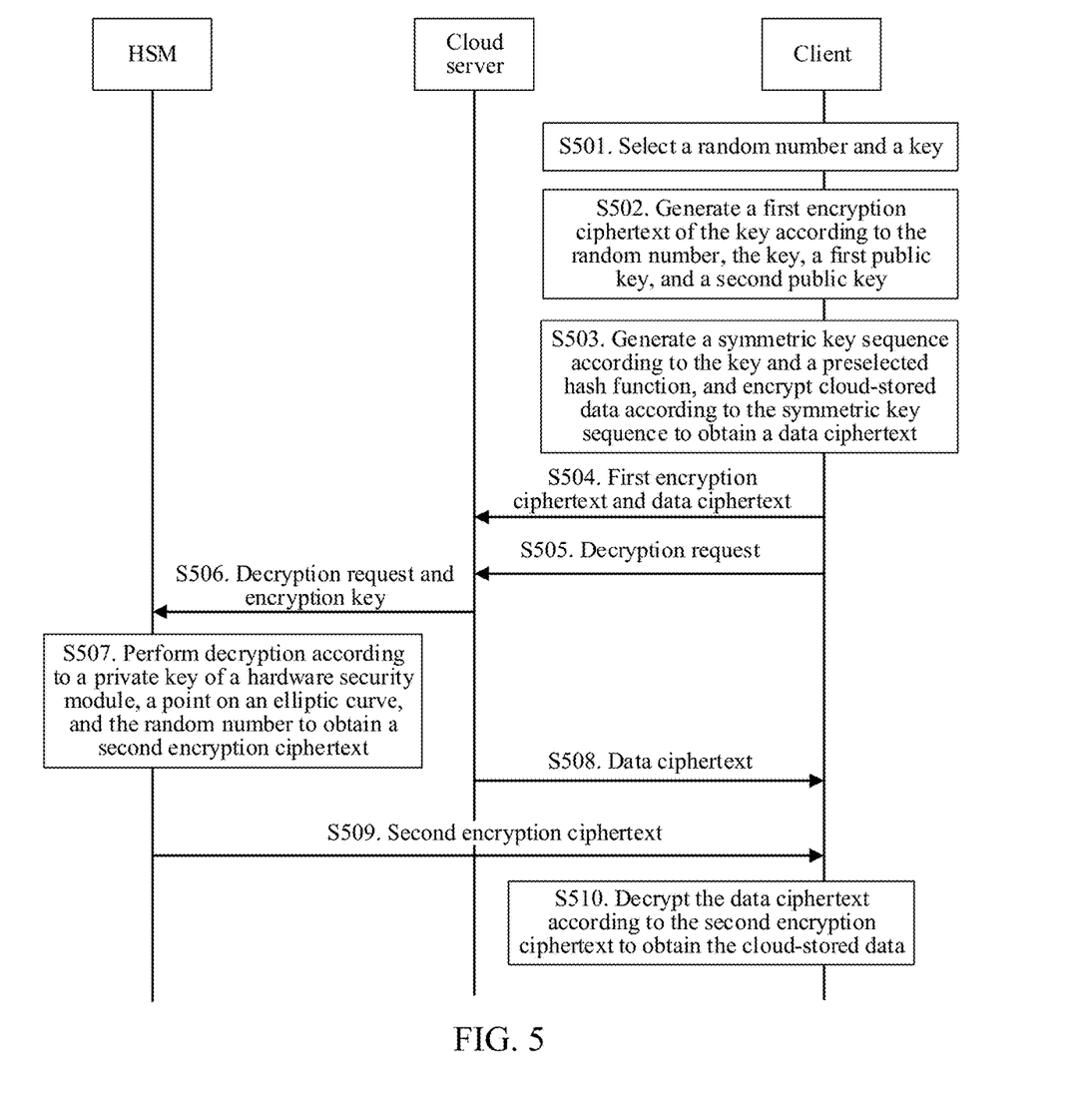
FIG. 5 is a schematic flowchart of another key management method according to an embodiment of this disclosure.

FIG. 5 is a schematic flowchart of another key management method according to an embodiment of this disclosure. This embodiment of this disclosure includes at least the following steps:

S501. A client selects a random number and a key according to an operation instruction inputted by a user. The random number and the key are both less than n, n being an order of a point on an elliptic curve.

In a specific implementation, for example, a user may access, through a client, a web page for creating a key on a cloud server. The client may receive an operation instruction inputted by the user through the web page for creating a key (for example, the user clicks or taps a button for generating a key on the web page), and execute code on the web page, to select any integer from a range from 1 to n−1 as a random number, and select an integer from a range from 1 to n−1 as a key, n being an order of a point on an elliptic curve. For example, for an elliptic curve E: $y^2=x^3+ax+b$, if for a point P on the elliptic curve, a minimum positive integer n exists and makes n times P=O∞, n is referred to as an order of P; if n does not exist, P is of infinite order. O∞ is an infinity point on the elliptic curve.

Exemplarily, before the client selects a random number and a key, the HSM can perform initialization on the key management system. For example, when a user creates an account of the user on the cloud server, the HSM performs the initialization on the key management system. Specifically, the HSM may select, according to a selection instruction inputted by the user, one prime number q from a plurality of prime numbers, and then, select two non-negative integers a and b less than q from a plurality of integers, to make that $4a^3+27b^2=0 \mod q$ is not established. Therefore, all points (x, y) that satisfy the formula $E:y^2=x^3+ax+b$ and the infinite point O∞ form an elliptic curve, where x and y are integers ranging from 0 to p−1. Then, the HSM performs discretization on the elliptic curve, for example, $y^2+x^3+ax+b \mod q$, to obtain all solutions $(x, y) \in Z_q$ and one infinite point O∞. Finally, the HSM selects one point P from all the solutions as any point on the elliptic curve, and an order of the point P is n. In addition, the HSM may receive the selection instruction inputted by the user and select one hash function from a plurality of hash functions, to make the hash function satisfy a condition $H:\{0,1\}^* \to \{0,1\}^{1025}$. The hash function may map any character string to a character string of a fixed length.

Then, the HSM may select an integer $s_1$ from [1, n−1] as a private key of the HSM, and then calculate a first public key of the HSM according to the private key of the HSM and a point P on an elliptic curve, where the first public key is $S_1=s_1g^P$ and may be represented as $(S_1, P)$.

During initialization of the key management system, the client may receive the point P on the elliptic curve and n (an order of P) sent by the HSM, then select, according to a selection instruction inputted by the user (where for example, the selection instruction is inputted through a web page provided by the cloud server or the HSM), select one integer $s_2$ from [1, n−1] as a private key of the client, and then calculate a second public key of the client according to the private key of the client and the point P on the elliptic curve, where the second public key $S_2=s_2 g^P$, and may be represented as ($S_2$, P). The user may download the private key of the client through the client, and store the private key in a memory of the client. The public key and the private key of the client are also referred to as a public key and a private key of the user.

S502. The client generates a first encryption ciphertext of the key according to the random number, the key, a first public key, and a second public key, the first public key being determined according to a point on an elliptic curve and a private key of an HSM, and the second public key being determined according to the point on the elliptic curve and a private key of the client;

In a specific implementation, the client may generate, by using the ECC, an encryption ciphertext Ek (that is, the first encryption ciphertext) of a key K according to both the first public key ($S_1$, P) of the HSM and the second public key ($S_2$, P) of the client, that is, Ek=(r·P, ($S_1+S_2$)·r+k) (formula 1), where r is the random number, k is the key, $S_1$ is the first public key, and $S_2$ is the second public key. It can be learned from formula 1 that the encryption ciphertext Ek is determined jointly by the first public key of the HSM and the second public key of the client. r·P represents calculating a mapped point on the elliptic curve according to the random number r and the point P on the elliptic curve. The private key of the HSM is an integer selected by the HSM from a range from 1 to n−1, and the private key of the client is an integer selected by the client from a range from 1 to n−1, n being an order of the point on the elliptic curve.

S503. The client generates a symmetric key sequence according to the key and a preselected hash function, and encrypts cloud-stored data according to the symmetric key sequence to obtain a data ciphertext.

In a specific implementation, the client may call an encryption API, to generate, according to the key and a preselected hash function, a symmetric key sequence (H(1∥k), H(2∥k), . . . , H(m∥k)) used for encrypting cloud-stored data, where k is the key, and His the hash function, and encrypt, by using the ECC, cloud-stored data (m1, m2, . . . mk) according to the symmetric key sequence (H(1∥k), H(2∥k), . . . , H (m∥k)) to obtain a data ciphertext (Enc (m1), . . . , Enc (mk)).

S504. The client transmits the first encryption ciphertext and the data ciphertext to a cloud server. The cloud server stores the first encryption ciphertext and the data ciphertext. For example, FIG. 4 is a schematic diagram of a storage format of a first encryption ciphertext and a data ciphertext according to an embodiment of this disclosure. The former portion is the first encryption ciphertext, and the latter portion is the data ciphertext. The data ciphertext can be decrypted by using the first encryption ciphertext. Because the first encryption ciphertext is generated according to the first public key of the HSM and the second public key of the client, the first encryption ciphertext needs to be jointly decrypted by the HSM and the client, so as to obtain the key.

S505. The client transmits a decryption request to the cloud server.

For example, when the user accesses cloud-stored data stored on the cloud server through a web page on the cloud server, the client transmits a decryption request to the cloud server. The decryption request, for example, may include a file name of the cloud-stored data, account information of the user, and the like.

S506. The cloud server transmits the first encryption ciphertext and the decryption request to the HSM.

The cloud server, for example, may obtain the first encryption ciphertext according to the account information of the user, and transmit the first encryption ciphertext and the decryption request together to the HSM.

S507. The HSM decrypts the first encryption ciphertext according to the private key of the HSM, the point on the elliptic curve, and the random number to obtain a second encryption ciphertext.

In a specific implementation, after receiving the decryption request, the HSM decrypts the first encryption ciphertext by using the private key $s_1$ of the HSM, to calculate a second encryption ciphertext $\tilde{Ek}$, $\tilde{Ek}$, for example, being:

$$\tilde{Ek}=(r·P,(S_1+S_2)·r+k-s_1·r·P)=(r·P,S_2·r+k), \quad \text{(Formula 2)}$$

It can be learned from formula 2 that the second encryption ciphertext $\tilde{Ek}$ is determined by only the second public key of the client.

Exemplarily, the HSM may receive a data ciphertext (Enc (m1), . . . , Enc (mk)) transmitted by the cloud server, and transmit the data ciphertext (Enc (m1), . . . , Enc (mk)) and the second encryption ciphertext $\tilde{Ek}$ to the client.

S508. The cloud server transmits a data ciphertext to the client. Exemplarily, S508 may be performed after S506 and before S507.

S509. The HSM transmits the second encryption ciphertext to the client.

S510. The client decrypts the data ciphertext according to the second encryption ciphertext to obtain the cloud-stored data.

In a specific implementation, the client may decrypt the second encryption ciphertext r·P, $S_2$·r+k according to the private key of the client, the random number, and the point on the elliptic curve to obtain the key $S_2$·r+k-$s_2$·r·P=k, then call a decryption API, to generate the symmetric key sequence (H(1∥k), H(2∥k), . . . , H(m∥k) according to the key k and the hash function, where k is the key, and H is the hash function, and finally, decrypt the data ciphertext (Enc (m1), . . . , Enc (mk)) according to the symmetric key sequence (H(1∥k), H (2∥k), . . . , H (m∥k)) to obtain the cloud-stored data (m1, m2, . . . mk).

Figure 6:
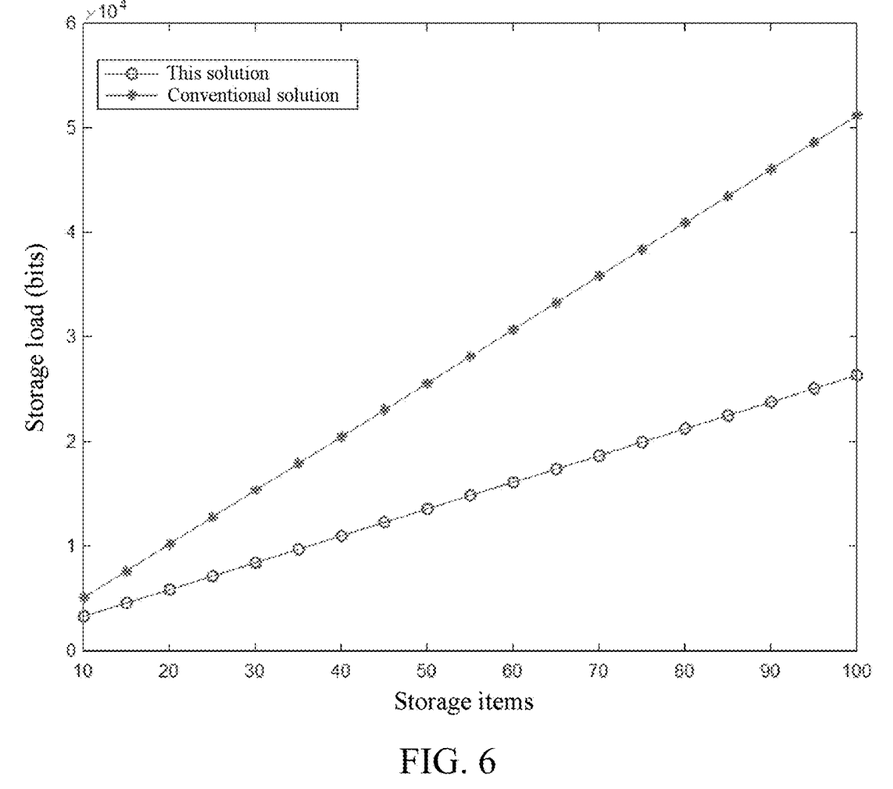
FIG. 6 is a schematic diagram of storage load comparison according to an embodiment of this disclosure.

FIG. 6 is a schematic diagram of storage load comparison according to an embodiment of this disclosure. In this embodiment of this disclosure, a length of a data ciphertext using the AES is 256 bits, and a length of an encryption ciphertext using the ECC is 384 bits. Since a layer-by-layer wrapping structure is used in a conventional solution, in a case of the same storage items, a storage load of this solution is less than a storage load of the conventional solution. Therefore, use of this embodiment of this disclosure can greatly improve storage efficiency of cloud-stored data.

In this embodiment of this disclosure, the HSM performs decryption according to the private key of the HSM, the point on the elliptic curve, and the random number to obtain a second encryption ciphertext, and then, the client decrypts the second encryption ciphertext according to the private key of the client, the random number, and the point on the elliptic curve to obtain the key. Therefore, an encryption ciphertext stored by the client on the cloud server can be encrypted only in a scenario in which the client and the HSM jointly provide a key, thereby guaranteeing the privacy and integrity of cloud-stored data.

Figure 7:
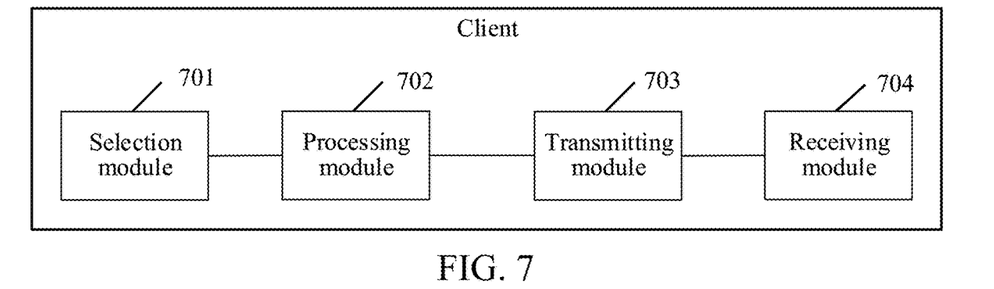
FIG. 7 is a schematic structural diagram of a client according to an embodiment of this disclosure.

FIG. 7 is a schematic structural diagram of a client according to an embodiment of this disclosure. In this embodiment of this disclosure, the client includes at least a selection module 701, a processing module 702, and a transmitting module 703.

The selection module 701 is configured to select a random number and a key according to an operation instruction inputted by a user. The random number and the key are both less than n, n being an order of a point on an elliptic curve.

In a specific implementation, for example, a user may access, through a client, a web page for creating a key on a cloud server. The client may receive an operation instruction inputted by the user through the web page for creating a key (for example, the user clicks or taps a button for generating a key on the web page), and execute code on the web page, to select any integer from a range from 1 to n−1 as a random number, and select an integer from a range from 1 to n−1 as a key, n being an order of a point on an elliptic curve. For example, for an elliptic curve E: $y^2=x^3+ax+b$, if for a point P on the elliptic curve, a minimum positive integer n exists and makes n times $P=O\infty$, n is referred to as an order of P, and if n does not exist, P is of infinite order. $O\infty$ is an infinity point on the elliptic curve.

Exemplarily, before the client selects a random number and a key, the HSM can perform initialization on the key management system. For example, when a user creates an account of the user on the cloud server, the HSM performs the initialization on the key management system. Specifically, the HSM may select, according to a selection instruction inputted by the user, one prime number q from a plurality of prime numbers, and then, select two non-negative integers a and b less than q from a plurality of integers, to make that $4a^3+27b^2=0$ mod q is not established. Therefore, all points (x, y) that satisfy the formula $E:y^2=x^3+ax+b$ and the infinite point $O\infty$ form an elliptic curve, where x and y are integers ranging from 0 to p−1. Then, the HSM performs discretization on the elliptic curve, for example, $y^2=x^3+ax+b$ mod q, to obtain all solutions $(x, y) \in Z_q$ and one infinite point $O\infty$. Finally, the HSM selects one point P from all the solutions as any point on the elliptic curve, and an order of the point P is n. In addition, the HSM may receive the selection instruction inputted by the user and select one hash function from a plurality of hash functions, to make the hash function satisfy a condition $H:\{0,1\}^* \rightarrow \{0,1\}^{1024}$. The hash function may map any character string to a character string of a fixed length.

Then, the HSM may select an integer $s_1$ from [1, n−1] as a private key of the HSM, and then calculate a first public key of the HSM according to the private key of the HSM and a point P on an elliptic curve, where the first public key is $S_1=s_1g^P$, and is represented as $(S_1,P)$.

During initialization of the key management system, the client may receive the point P on the elliptic curve and n (an order of P) sent by the HSM, then select, according to a selection instruction inputted by the user (for example, the selection instruction is inputted through a web page provided by the cloud server or the HSM), select one integer $s_2$ from [1, n−1] as a private key of the client, and then calculate a second public key of the client according to the private key of the client and the point P on the elliptic curve, where the second public key $S_2=s_2g^P$ and is represented as $(S_2, P)$. The user may download the private key of the client through the client, and store the private key in a memory of the client. The public key and the private key of the client are also referred to as a public key and a private key of the user.

The processing module 702 is configured to generate a first encryption ciphertext of the key according to the random number, the key, a first public key, and a second public key, the first public key being determined according to a point on an elliptic curve and a private key of a hardware security module (HSM), and the second public key being determined according to the point on the elliptic curve and a private key of the client.

In a specific implementation, an encryption ciphertext Ek (that is, the first encryption ciphertext) of a key K may be generated by using the ECC according to both the first public key $(S_1, P)$ of the HSM and the second public key $(S_2, P)$ of the client, that is, $Ek=(r\cdot P, (S_1+S_2)\cdot r+k)$, where r is the random number, k is the key, $S_1$ is the first public key, and $S_2$ is the second public key. It can be learned from the formula that the encryption ciphertext Ek is determined jointly by the first public key of the HSM and the second public key of the client. $r \cdot P$ represents calculating a mapped point on the elliptic curve according to the random number r and the point P on the elliptic curve. The private key of the HSM is an integer selected by the HSM from a range from 1 to n−1, and the private key of the client is an integer selected by the client from a range from 1 to n−1, n being an order of the point on the elliptic curve.

The processing module 702 is further configured to generate a symmetric key sequence according to the key and a preselected hash function, and encrypt cloud-stored data according to the symmetric key sequence to obtain a data ciphertext.

In a specific implementation, the processing module 702 may call an encryption API, to generate, according to the key and a preselected hash function, a symmetric key sequence $(H(1\|k), H(2\|k), \ldots, H(m\|k))$ used for encrypting cloud-stored data, where k is the key, and H is the hash function, and encrypt, by using the ECC, cloud-stored data (m1, m2, ... mk) according to the symmetric key sequence $(H(1\|k), H(2\|k), \ldots, H(m\|k))$ to obtain a data ciphertext (Enc (m1), ..., Enc (mk)).

The transmitting module 703 is configured to transmit the first encryption ciphertext and the data ciphertext to a cloud server. The cloud server stores the first encryption ciphertext and the data ciphertext. FIG. 4 is a schematic diagram of a storage format of a first encryption ciphertext and a data ciphertext according to an embodiment of this disclosure. The former portion is the first encryption ciphertext, and the latter portion is the data ciphertext. The data ciphertext can be decrypted by using the first encryption ciphertext. Because the first encryption ciphertext is generated according to the first public key of the HSM and the second public key of the client, the first encryption ciphertext needs to be jointly decrypted by the HSM and the client, so as to obtain the key.

Exemplarily, the transmitting module 703 is further configured to transmit a decryption request to the cloud server, the decryption request being used for instructing the cloud server to transmit the first encryption ciphertext to the HSM, the first encryption ciphertext being used for instructing the HSM to decrypt the first encryption ciphertext according to the private key of the HSM, the point on the elliptic curve, and the random number to obtain a second encryption ciphertext;

Exemplarily, the client further includes:

a receiving module 704, configured to receive the second encryption ciphertext transmitted by the HSM, and receive the data ciphertext transmitted by the cloud server. After receiving the decryption request, the HSM calculates a second encryption ciphertext $\tilde{Ek}$ by using the private key of the HSM $\tilde{Ek}=(r\cdot P,(S_1+S_2)\cdot r+k-s_1\cdot r\cdot P)=(r\cdot P, S_2\cdot r+k)$. It can be learned from the formula that the second encryption ciphertext $\overline{Ek}$ is determined by only the second public key of the client.

The processing module 702 is further configured to decrypt the data ciphertext according to the second encryption ciphertext to obtain the cloud-stored data.

Further, the processing module 702 is further configured to decrypt the second encryption ciphertext according to the private key of the client, the random number, and the point on the elliptic curve to obtain the key; generate the symmetric key sequence according to the key and the hash function; and decrypt the data ciphertext according to the symmetric key sequence to obtain the cloud-stored data.

In a specific implementation, the client decrypts the second encryption ciphertext r·P, $S_2$·r+k according to the private key of the client, the random number, and the point on the elliptic curve to obtain the key $S_2$·r+k−$s_2$·r·P=k, then calls a decryption API, to generate the symmetric key sequence (H(1∥k), H(2∥k), . . . , H(m∥k)) according to the key k and the hash function, where k is the key, and H is the hash function, and finally, decrypts the data ciphertext (Enc (m1), . . . , Enc (mk)) according to the symmetric key sequence to obtain the cloud-stored data (m1, m2, . . . mk).

Further, for a specific implementation of the client in this embodiment of this disclosure, refer to operation steps of the client in the foregoing method embodiments.

Figure 8:
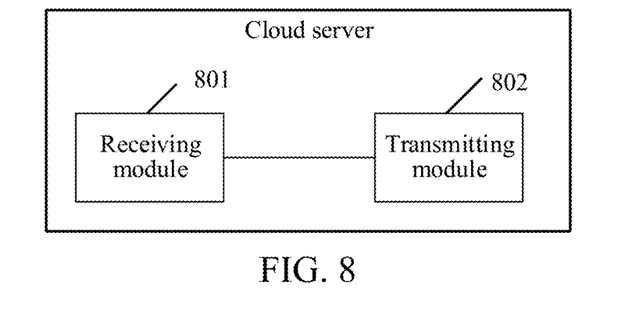
FIG. 8 is a schematic structural diagram of a cloud server according to an embodiment of this disclosure.

FIG. 8 is a schematic structural diagram of a cloud server according to an embodiment of this disclosure. The cloud server in this embodiment of this disclosure includes at least a receiving module 801 and a transmitting module 802.

The receiving module 801 is configured to receive a first encryption ciphertext and a data ciphertext transmitted by a client, the first encryption ciphertext being generated according to a random number, a key, a first public key, and a second public key, the first public key being determined according to a point on an elliptic curve and a private key of an HSM, the second public key being determined according to the point on the elliptic curve and a private key of the client, the data ciphertext being obtained by encrypting cloud-stored data according to a symmetric key sequence, and the symmetric key sequence being generated according to the key and a preselected hash function.

Exemplarily, the receiving module 801 is configured to receive a decryption request transmitted by the client.

The transmitting module 802 is configured to transmit the first encryption ciphertext to the HSM, the first encryption ciphertext being used for instructing the HSM to decrypt the first encryption ciphertext according to the private key of the HSM, the point on the elliptic curve, and the random number to obtain a second encryption ciphertext.

The transmitting module 802 is configured to transmit the data ciphertext to the client, the data ciphertext being encrypted by the client according to the second encryption ciphertext to obtain the cloud-stored data.

The term module (and other similar terms such as unit, submodule, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Further, for a specific implementation of the cloud server in this embodiment of this disclosure, refer to operation steps of the cloud server in the foregoing method embodiments.

Figure 9:
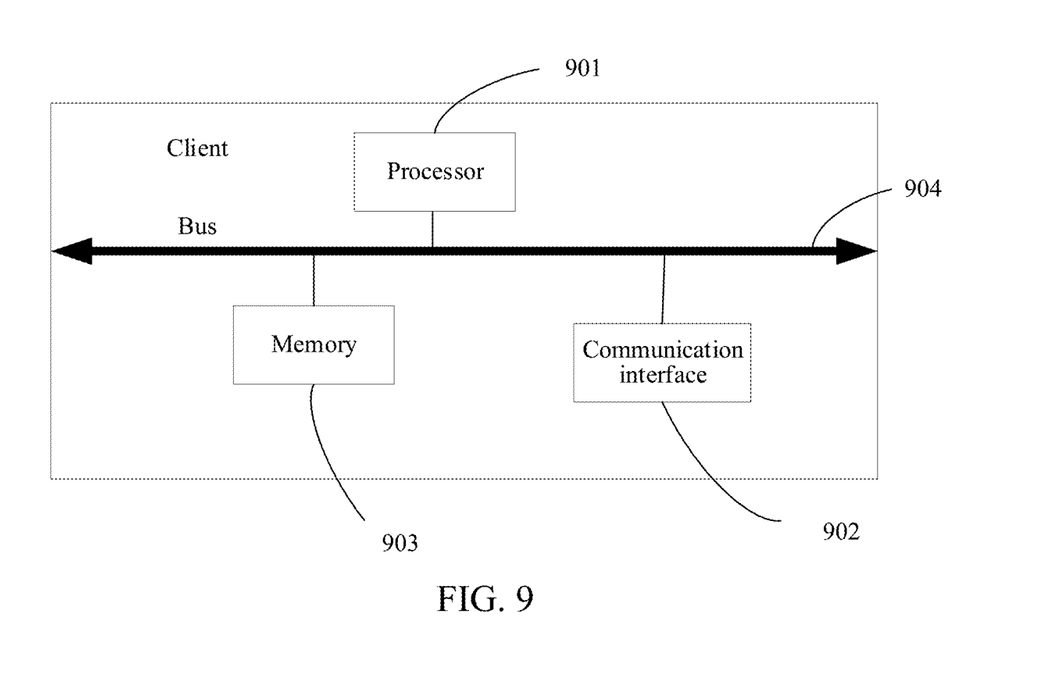
FIG. 9 is a schematic structural diagram of another client according to an embodiment of this disclosure.

FIG. 9 is a schematic structural diagram of another client according to an embodiment of this disclosure. As shown in FIG. 9, the client may include: at least one processor 901, at least one communication interface 902, at least one memory 903, and at least one communication bus 904.

The processor 901 may be a central processing unit, a general-purpose processor, a digital signal processor, an application-specific integrated circuit, a field programmable gate array or another programmable logic device, a transistor logic device, a hardware component, or any combination thereof. The processor may implement or perform various examples of logic blocks, modules, and circuits described with reference to content disclosed in this disclosure. The processor may alternatively be a combination to implement a computing function, for example, may be a combination of one or more microprocessors, a combination of a digital signal processor and a microprocessor, or the like. The communication bus 904 may be a peripheral component interconnect (PCI) bus, an extended industry standard architecture (EISA) bus, or the like. The bus may be classified as an address bus, a data bus, a control bus, or the like. For ease of description, the bus in FIG. 9 is represented by using only one bold line, but this does not indicate that there is only one bus or one type of bus. The communication bus 904 is configured to implement connection and communication between the components. The communication bus 902 of the device in this embodiment of this disclosure is configured to communicate signaling or data with another node device. The memory 903 may include a volatile memory, for example, a non-volatile dynamic random access memory (NVRAM), a phase change random access memory (PRAM), or a magnetoresistive random access memory (MRAM), and may further include a non-volatile memory, for example, at least one magnetic disk storage device, an electrically erasable programmable read-only memory (EE-PROM), a flash memory device such as a NOR flash memory or a NAND flash memory, or a semiconductor device such as a solid state disk (SSD). Exemplarily, the memory 903 may alternatively be at least one storage apparatus far away from the processor 901. Exemplarily, the memory 903 may further store a set of program code. Exemplarily, the processor 901 may further execute a program stored in the memory 903, including the following steps:

selecting a random number and a key according to an operation instruction inputted by a user;

generating a first encryption ciphertext of the key according to the random number, the key, a first public key, and a second public key, the first public key being determined according to a point on an elliptic curve and a private key of an HSM, and the second public key being determined according to the point on the elliptic curve and a private key of the client;

generating a symmetric key sequence according to the key and a preselected hash function, and encrypting cloud-stored data according to the symmetric key sequence to obtain a data ciphertext; and     transmitting the first encryption ciphertext and the data ciphertext to a cloud server.

Exemplarily, the processor 901 may further be configured to perform the following steps:

transmitting a decryption request to the cloud server, the decryption request being used for instructing the cloud server to transmit the first encryption ciphertext to the HSM, the first encryption ciphertext being used for instructing the HSM to decrypt the first encryption ciphertext according to the private key of the HSM, the point on the elliptic curve, and the random number to obtain a second encryption ciphertext;

receiving the second encryption ciphertext transmitted by the HSM, and receiving the data ciphertext transmitted by the cloud server; and decrypting the data ciphertext according to the second encryption ciphertext to obtain the cloud-stored data.

Exemplarily, the processor 901 may further be configured to perform the following steps:

decrypting the second encryption ciphertext according to the private key of the client, the random number, and the point on the elliptic curve to obtain the key;

generating the symmetric key sequence according to the key and the hash function; and decrypting the data ciphertext according to the symmetric key sequence to obtain the cloud-stored data.

The random number and the key are both less than n, n being an order of the point on the elliptic curve.

The private key of the HSM is an integer selected by the HSM from a range from 1 to n−1, and the private key of the client is an integer selected by the client from a range from 1 to n−1, n being an order of the point on the elliptic curve.

Further, the processor may further cooperate with the memory and the communication interface to perform operations of the client in the foregoing embodiments of this disclosure.

Figure 10:
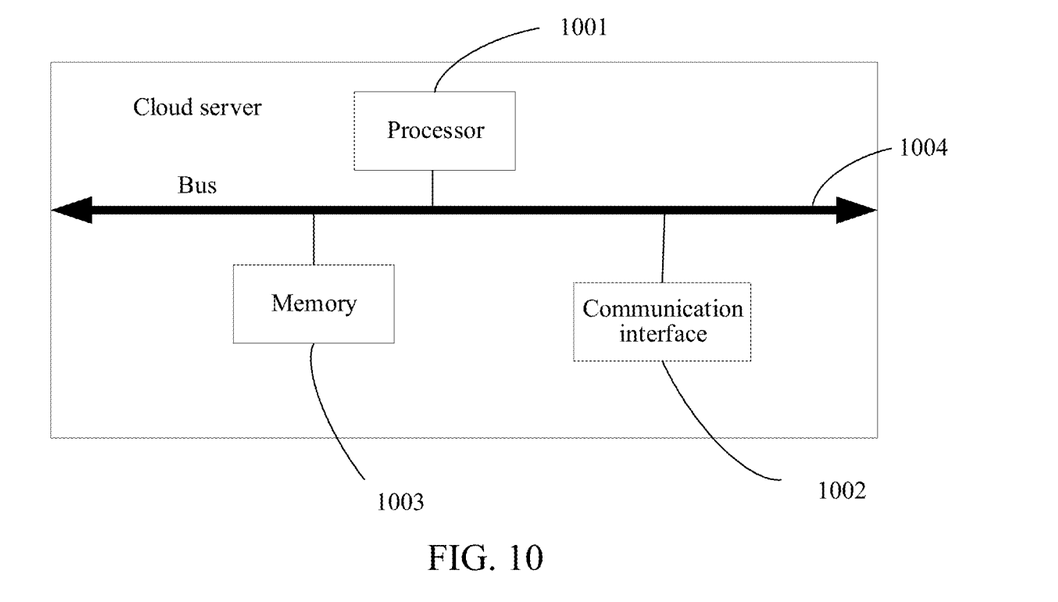
FIG. 10 is a schematic structural diagram of another cloud server according to an embodiment of this disclosure.

FIG. 10 is a schematic structural diagram of another cloud server according to an embodiment of this disclosure. As shown in the figure, the cloud server may include: at least one processor 1001, at least one communication interface 1002, at least one memory 1003, and at least one communication bus 1004.

The processor 1001 may be various types of processors mentioned above. The communication bus 1004 may be a peripheral component interconnect (PCI) bus, an extended industry standard architecture (EISA) bus, or the like. The bus may be classified as an address bus, a data bus, a control bus, or the like. For ease of description, the bus in FIG. 10 is represented by using only one bold line, but this does not indicate that there is only one bus or one type of bus. The communication bus 1004 is configured to implement connection and communication between the components. The communication bus 1002 of the device in this embodiment of this disclosure is configured to communicate signaling or data with another node device. The memory 1003 may be various types of memories mentioned above. Exemplarily, the memory 1003 may alternatively be at least one storage apparatus far away from the processor 1001. The memory 1003 stores a set of program code. Exemplarily, the processor 1001 executes a program stored in the memory 1003, including the following steps:

receiving a first encryption ciphertext and a data ciphertext transmitted by a client, the first encryption ciphertext being generated according to a random number, a key, a first public key, and a second public key, the first public key being determined according to a point on an elliptic curve and a private key of an HSM, the second public key being determined according to the point on the elliptic curve and a private key of the client, the data ciphertext being obtained by encrypting cloud-stored data according to a symmetric key sequence, and the symmetric key sequence being generated according to the key and a preselected hash function; and storing the first encryption ciphertext and the data ciphertext.

Exemplarily, the processor 1001 may further be configured to perform the following steps:

receiving a decryption request transmitted by the client;

transmitting the first encryption ciphertext to the HSM, the first encryption ciphertext being decrypted by the HSM according to the private key of the HSM, the point on the elliptic curve, and the random number to obtain a second encryption ciphertext; and transmitting the data ciphertext to the client, the data ciphertext being encrypted by the client according to the second encryption ciphertext to obtain the cloud-stored data.

Further, the processor may further cooperate with the memory and the communication interface to perform operations of the cloud server in the foregoing embodiments of this disclosure.

All or some of the foregoing embodiments may be implemented by using software, hardware, firmware, or any combination thereof. When software is used for implementation, all or some of the embodiments may be implemented in a form of a computer program product. The computer program product includes one or more computer instructions. When the computer instructions are loaded and executed on a computer, all or some of the procedures or functions according to the embodiments of this disclosure are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid state disk (SSD)), or the like.

The foregoing specific implementations further describe the objectives, technical solutions, and beneficial effects of this disclosure in detail. Any modification, equivalent replacement, or improvement made without departing from the spirit and principle of this disclosure shall fall within the protection scope of this disclosure.

What is claimed is:

1. A key management method, comprising:

selecting, by a client, a random number and a key according to an operation instruction inputted by a user;

generating, by the client, a first encryption ciphertext of the key, according to the random number, the key, a first public key, and a second public key, the first public key being determined according to a point on an elliptic curve and a private key of a hardware security module (HSM), and the second public key being determined according to the point on the elliptic curve and a private key of the client;

generating, by the client, a symmetric key sequence according to the key and a preselected hash function;

encrypting data according to the symmetric key sequence to obtain a data ciphertext; and transmitting, by the client, the first encryption ciphertext and the data ciphertext to a cloud server.

2. The method according to claim 1, after transmitting the first encryption ciphertext and the data ciphertext to the cloud server, further comprising:

transmitting, by the client, a decryption request to the cloud server, the decryption request being used for instructing the cloud server to transmit the first encryption ciphertext to the HSM to be decrypted by the HSM, according to the private key of the HSM, the point on the elliptic curve, and the random number, to obtain a second encryption ciphertext;

receiving, by the client, the second encryption ciphertext transmitted by the HSM and the data ciphertext transmitted by the cloud server; and decrypting, by the client, the data ciphertext according to the second encryption ciphertext to obtain the data.

3. The method according to claim 2, wherein decrypting the data ciphertext according to the second encryption ciphertext to obtain the data comprises:

decrypting, by the client, the second encryption ciphertext according to the private key of the client, the random number, and the point on the elliptic curve to obtain the key;

generating, by the client, the symmetric key sequence according to the key and the hash function; and decrypting, by the client, the data ciphertext according to the symmetric key sequence to obtain the data.

4. The method according to claim 1, wherein the random number and the key are both less than n, n being an order of the point on the elliptic curve.

5. The method according to claim 1, wherein the private key of the HSM is an integer selected by the HSM from a range from 1 to n−1, and the private key of the client is an integer selected by the client from a range from 1 to n−1, n being an order of the point on the elliptic curve.

6. A key management method, comprising:

receiving, by a cloud server, a first encryption ciphertext transmitted by a client, the first encryption ciphertext being generated according to a random number, a key, a first public key, and a second public key, the first public key being determined according to a point on an elliptic curve and a private key of a hardware security module (HSM), the second public key being determined according to the point on the elliptic curve and a private key of the client;

receiving, by the cloud server, a data ciphertext transmitted by the client, the data ciphertext being obtained by encrypting data according to a symmetric key sequence, and the symmetric key sequence being generated according to the key and a preselected hash function; and storing, by the cloud server, the first encryption ciphertext and the data ciphertext.

7. The method according to claim 6, the method further comprising:

receiving, by the cloud server, a decryption request transmitted by the client;

transmitting, by the cloud server, the first encryption ciphertext to the HSM to be decrypted by the HSM, according to the private key of the HSM, the point on the elliptic curve, and the random number, to obtain a second encryption ciphertext; and transmitting, by the cloud server, the data ciphertext to the client to be decrypted by the client, according to the second encryption ciphertext, to obtain the data.

8. The method according to claim 6, wherein the random number and the key are both less than n, n being an order of the point on the elliptic curve.

9. The method according to claim 6, wherein the private key of the HSM is an integer selected by the HSM from a range from 1 to n−1, and the private key of the client is an integer selected by the client from a range from 1 to n−1, n being an order of the point on the elliptic curve.

10. A key management method, comprising:

providing a private key of a hardware security module (HSM), the private key of the HSM being used to determine a first public key to be used, with a second public key, to generate a first encryption ciphertext of a key by encrypting the key according to the first public key and the second public key;

receiving the first encryption ciphertext from a cloud server; and decrypting the first encryption ciphertext, by the HSM, according to the private key of the HSM, a point on a elliptic curve, and a random number, to obtain a second encryption ciphertext; and transmitting the second encryption ciphertext to a client, the second encryption ciphertext being configured to be decrypted by the client, according to a private key of the client, the random number, and the point on the elliptic curve, to obtain the key for decrypting a data ciphertext from the cloud server.

11. The method of claim 10, wherein the first encryption ciphertext is generated according to the random number, the key, the first public key, and the second public key, the first public key is determined according to the point on the elliptic curve and the private key of the HSM, and the second public key is determined according to the point on the elliptic curve and the private key of the client.

12. The method according to claim 10, wherein the random number and the key are both less than n, n being an order of the point on the elliptic curve.

13. The method according to claim 10, wherein the private key of the HSM is an integer selected by the HSM from a range from 1 to n−1, and the private key of the client is an integer selected by the client from a range from 1 to n−1, n being an order of the point on the elliptic curve.

14. A key management device, comprising:

a memory, configured to store at least one computer-readable program;

a processor, electrically coupled to the memory and configured to, when executing the at least one computer-readable program, cause the key management device to perform the method of claim 1.

15. The key management device of claim 14, wherein the processor is further configured to cause the key management device to:

transmit, by the client, a decryption request to the cloud server, the decryption request being used for instructing the cloud server to transmit the first encryption ciphertext to the HSM to be decrypted by the HSM, according to the private key of the HSM, the point on the elliptic curve, and the random number, to obtain a second encryption ciphertext;

receive, by the client, the second encryption ciphertext transmitted by the HSM and the data ciphertext transmitted by the cloud server; and decrypt, by the client, the data ciphertext according to the second encryption ciphertext to obtain the data.

16. The key management device of claim 15, wherein the processor is further configured to cause the key management device to decrypt the data ciphertext according to the second encryption ciphertext to obtain the data by performing the steps, comprising:

decrypting, by the client, the second encryption ciphertext according to the private key of the client, the random number, and the point on the elliptic curve to obtain the key;

generating, by the client, the symmetric key sequence according to the key and the hash function; and     decrypting, by the client, the data ciphertext according to the symmetric key sequence to obtain the data.

17. The key management device of claim 14, wherein the random number and the key are both less than n, n being an order of the point on the elliptic curve.

18. The key management device of claim 14, wherein the private key of the HSM is an integer selected by the HSM from a range from 1 to n−1, and the private key of the client is an integer selected by the client from a range from 1 to n−1, n being an order of the point on the elliptic curve.

19. A non-transitory computer-readable storage medium, storing at least one computer program, the at least one computer program, when executed by a processor, causing a key management device to perform the method of claim 1.

20. The non-transitory computer-readable storage medium of claim 19, wherein the at least one computer program, when executed by a processor, further causes the key management device to:

transmit, by the client, a decryption request to the cloud server, the decryption request being used for instructing the cloud server to transmit the first encryption ciphertext to the HSM to be decrypted by the HSM, according to the private key of the HSM, the point on the elliptic curve, and the random number, to obtain a second encryption ciphertext;

receive, by the client, the second encryption ciphertext transmitted by the HSM and the data ciphertext transmitted by the cloud server; and     decrypt, by the client, the data ciphertext according to the second encryption ciphertext to obtain the data.

\* \* \* \* \*